United States Patent [19]

Gebauer et al.

[11] 4,092,837
[45] June 6, 1978

[54] TORSIONAL ISOLATOR COUPLING

[75] Inventors: Thomas Edward Gebauer; Larry Gene McMullen, both of Dubuque, Iowa

[73] Assignee: Deere & Company, Moline, Ill.

[21] Appl. No.: 743,397

[22] Filed: Nov. 19, 1976

[51] Int. Cl.² .............................. F16D 3/64; B16D 3/10
[52] U.S. Cl. .................................. 64/27 NM; 64/13; 64/14
[58] Field of Search ............... 64/11 R, 13, 27 NM; 74/574

[56] References Cited

U.S. PATENT DOCUMENTS

| 1,617,931 | 2/1927 | Wilson | 74/574 |
|---|---|---|---|
| 3,199,313 | 8/1965 | Paulsen | 64/11 R |
| 3,477,245 | 11/1969 | Martin | 64/11 R |
| 3,675,750 | 7/1972 | Wright | 64/27 NM |
| 3,727,431 | 4/1973 | Yokel | 64/27 NM |
| 3,830,081 | 8/1974 | Weber | 64/27 NM |
| 3,995,513 | 12/1976 | Amdall | 64/11 R |

Primary Examiner—Benjamin W. Wyche
Assistant Examiner—R. C. Turner

[57] ABSTRACT

A plurality of cylindrical, equiangularly spaced elastomeric isolator members are assembled axially between a drive plate fixed to an engine flywheel and a driven plate fixed to a transmission input shaft. The isolation members are resilient and yieldably resist relative rotation between the drive and driven plates at a first spring rate when torque loads are in a low range. When the torque load reaches an upper value of the low range, a pair of snubber members respectively mounted on the drive and driven plates are engaged by the flexed isolator members and support the latter such that torsional loads in a range higher than the low range will be yieldably resisted by the isolator members at a second spring rate higher than the first spring rate.

8 Claims, 4 Drawing Figures

4,092,837

TORSIONAL ISOLATOR COUPLING

BACKGROUND OF THE INVENTION

The present invention relates to a torque transmitting coupling which is ideally suited for use between an engine flywheel and the input shaft for a transmission. More particularly, the invention relates to such a coupling which will isolate the engine firing frequency torque vibrations from the transmission and withstand high torque spikes during start-up, shut down and transmission shifts.

In the operation of an internal-combustion engine, the engine is subjected to an interrupted concentrated force which is brought about by the movement or exciting action of the several pistons and connecting rods operatively connected to the crankshaft. The continuous application of the interrupted force on the crankshaft results in torsional vibrations which are not only felt by the crankshaft, but are transmitted to all components driven by the engine. To isolate the torsional vibrations present in the engine crankshaft it is customary to provide a flywheel on the engine shaft which, by its inertia, evens out the vibrations through energy storage and release. However, the action of the flywheel does not entirely eliminate the transfer of torsional vibration to transmission components downstream from the flywheel and those vibrations which are transmitted have been found to result in transmission performance which is less than would be possible without the presence of such vibrations.

While it is known to provide transmission drive trains with some type of torsional isolator coupling arranged between the flywheels and transmission input shafts for dampening torsional vibrations set up in the crankshafts, often these couplings have one or the other of the faults of not being able to isolate vibrations both under conditions of high and low torque loads and at the same time have the capacity to withstand high torque loading. Contributing to these faults is the fact that heretofore torsional isolator members employed in the couplings have operated at a constant spring rate throughout the entire range of torque loads imposed on the transmission.

SUMMARY OF THE INVENTION

According to the present invention, there is provided a novel torsional isolator coupling suitable for use in a transmission designed to operate over a wide range of torque loads.

An object of the invention is to provide a torsional isolator coupling embodying a plurality of isolator members arranged such that they yieldably resist torsional deflection at a first spring rate under a low range of torque loads and yieldably resist torsional deflection at a second spring rate considerably higher than the first spring rate under a high range of torque loads.

A further object is to provide a torsional isolator coupling which is rugged enough to withstand high torque loading.

Another object is to provide a torsional isolator coupling which employs isolator members having relatively high dampening characteristics.

The above objects are accomplished by providing a plurality of cylindrical elastomeric isolator members having threaded studs bonded to their opposite ends and to assemble the isolator members by fastening them, by means of nuts received on the studs, between drive and driven plates respectively fixed to a flywheel and to a transmission input shaft. When no load is imposed on the shaft, the drive and driven plates bear an initial angular relationship to each other wherein each of the isolator members is in an undeflected condition with its longitudinal axis disposed parallel to the axis of the input shaft. In response to increasing torque load in a low torque range, the isolator members will increasingly yieldably deflect at a first spring rate and the drive and driven plates will correspondingly become increasingly angularly displaced relative to each other from their initial relationship. To increase the spring rate of the isolator members so that they offer increasing resistance to deflection in response to torque loads in a high torque range, a pair of snubber members are respectively mounted on the drive and driven plates and include parts which partially surround each of the isolator members so as to be free of the isolator members when the plates are in their initial angular relationship and so as to engage the isolator members at locations spaced from the opposite ends thereof when the plates reach an intermediate position wherein they have become angularly spaced from each other relative to the initial angular relationship by an amount indicative of the reaching of an upper limit of the low torque range.

The above stated and other objects will become apparent from a reading of the ensuing description together with the appended drawings.

DESCRIPTION OF THE PREFERRED EMBODIMENT

Figure 1:
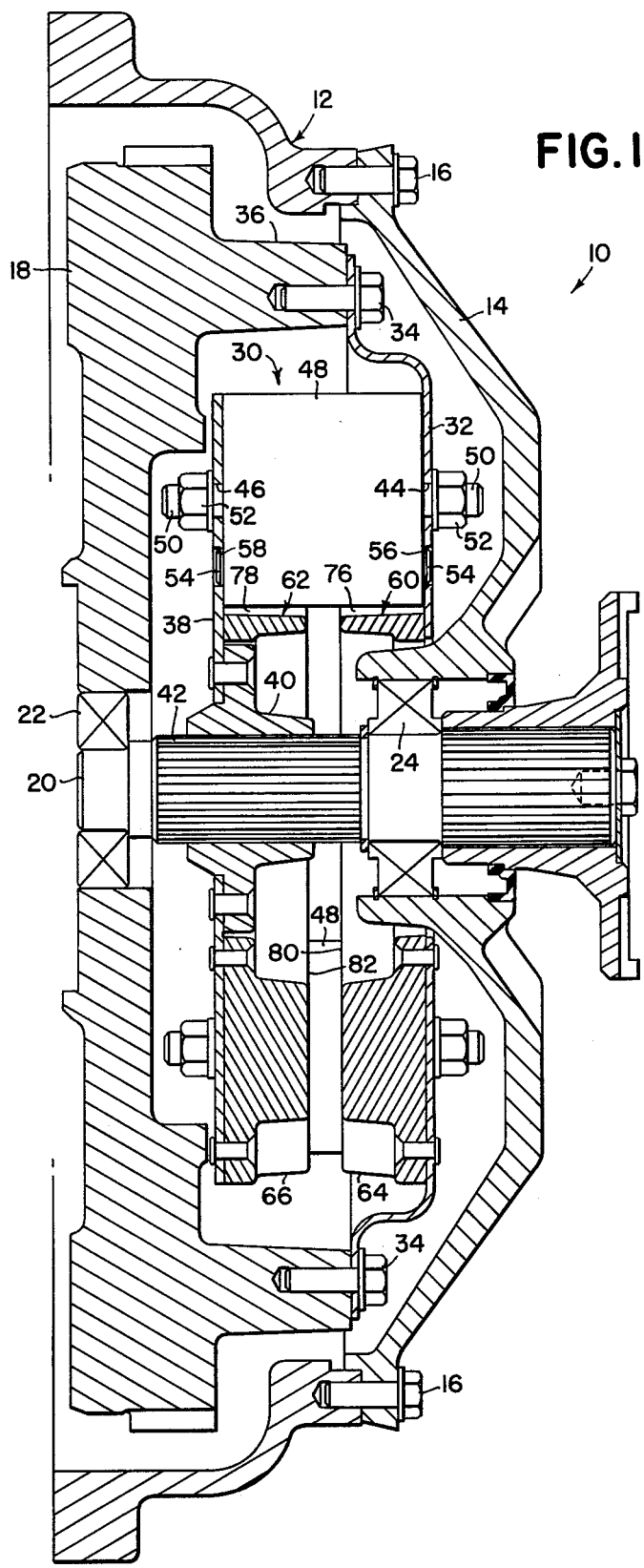
FIG. 1 is a sectional view taken through the drive axis of a flywheel and transmission input shaft coupled together by a torsional isolator coupling constructed according to the principles of the present invention.

Referring now to FIG. 1, therein is shown a section of a transmission drive train indicated in its entirety by the reference numeral 10. The drive train section 10 is that which would occur just after an engine (not shown) and includes a flywheel housing 12 including (as viewed in FIG. 1) an annular cover 14 removably fixed to the remainder of the housing by a plurality of cap screws 16 of which only two are visible. A flywheel 18 fixed for rotation with an engine crankshaft (not shown) is located in the housing 12 and a transmission input shaft 20 projects through the cover 14 and has its left end rotatably supported in the flywheel 18 by means of a bearing 22 while a second bearing 24 supports the shaft 20 in the cover 14.

Provided for connecting the input shaft 20 so as to be driven from the flywheel 18 is a torsional isolator coupling 30. Specifically, the coupling 30 includes an annular drive plate 32 fixed, as by a plurality of cap screws 34, to the right end of an axially rightwardly extending annular flange 36 of the flywheel 18 and a driven plate 38 fixed, as by a splined hub 40, to a splined section 42 of the shaft 20 located so as to be surrounded by the flywheel flange 36. The drive and driven plates 32 and 38 are respectively provided with similar equiangularly spaced sets of mounting holes 44 and 46 located equidistant from the axis of the shaft 20. Disposed between the plates 32 and 38 are a plurality of cylindrical elastomeric isolator members 48 to the opposite ends of which are bonded disks (not shown) to which threaded studs 50 are fixed so as to lie on the longitudinal axis of the isolator member with which they are associated. The studs 50 of a given isolator member 48 are received in an aligned pair of the sets of mounting holes 44 and 46 and nuts 52 are threaded on the studs 50 so as to hold the isolator members in equiangularly spaced locations about the axis of the shaft 20. To prevent the studs 50 from rotating in the sets of holes 42 and 46, a locator 54 is also fixed to the unshown disks bonded to the opposite ends of the isolator members 48, and the plates 32 and 38 are respectively provided with sets of holes 56 and 58 in which the locators 54 are received.

For the purpose of automatically changing the spring rate of deflection of the isolator members 48 in response to the torque load on the shaft 20 reaching a predetermined value, a pair of similarly constructed snubber members 60 and 62 are respectively fixed to opposed faces of the plates 32 and 38. Specifically, the snubber members 60 and 62 respectively include networks of ribbing 64 and 66 extending axially toward each other from and respectively fixed to the plates 32 and 38 by inner and outer sets of circularly arranged sets of rivets 68 and 70, and by inner and outer circularly arranged sets of rivets 72 and 74. The ribbing 64 defines a plurality of receptacles 76, which respectively extend circularly approximately three-fourths of the distance about the circumference of the right end portion, as viewed in FIG. 1, of the isolator members 48 so as to leave only the radially outermost quarter of each of the members 48 unencompassed by the ribbing 64. Similarly, the ribbing 66 defines a plurality of receptacles 78 which respectively extend approximately three-fourths the distance about the left end portions of the isolator members 48.

Figure 2:
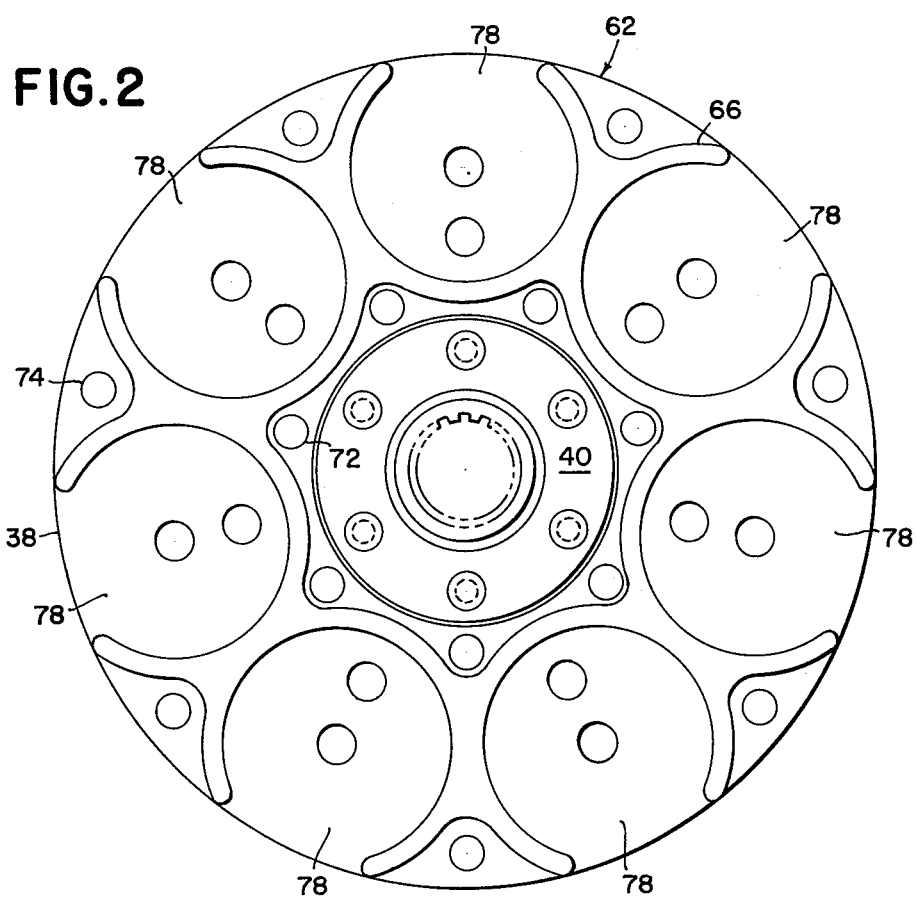
FIG. 2 is an axial view of the driven isolator coupling plate with the snubber member affixed thereto.
Figure 4:
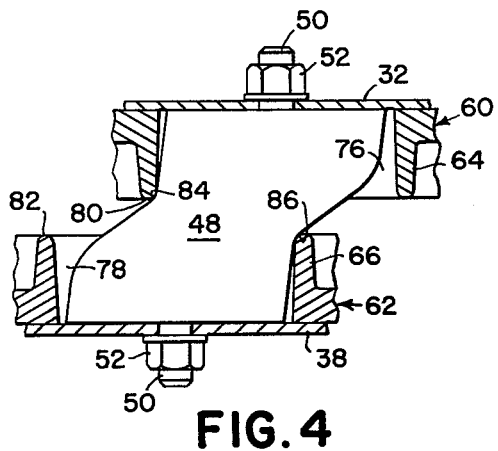
FIG. 4 is a view similar to that of FIG. 3 but showing the deflected condition of one of the isolator members when the torque load on the transmission reaches a value in the high torque range.
Figure 3:
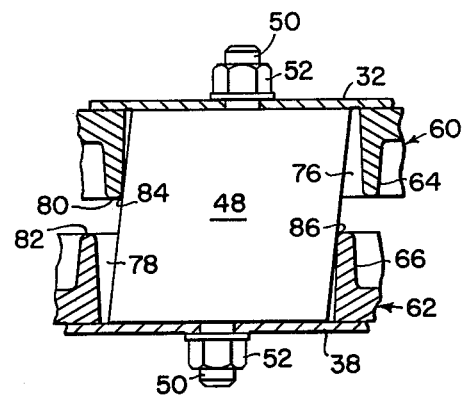
FIG. 3 is a sectional view taken through the isolator coupling and showing the position of one of the deflected isolator members relative to the snubber members when the torque load on the transmission reaches an upper value of the low torque range.

When little or no driving torque is being transferred through the coupling 30, the plates 32 and 38 will bear an initial angular relationship to each other wherein the isolator members 48 are undeflected and respectively coaxially disposed in opposed axially aligned pairs of the receptacles 76 and 78 in spaced relationship to the ribbing 64 and 66 as illustrated in FIG. 1. When the driving torque transferred through the coupling 30 reaches a predetermined upper limit of a low torque transfer range, the plates 32 and 38 will bear an intermediate angular relationship to each other wherein the receptacles 76 are displaced angularly ahead of the receptacles 78 such that isolator members 48 are deflected into engagement with opposed, axially facing ends 80 and 82 respectively of the networks of ribbing 64 and 66 (see FIG. 2), it being noted that the ends are rounded to prevent damage to the isolator members 48. The deflection of the isolator members 48 as the plates 32 and 38 move from their initial to their intermediate angular relationships to each other is uniform between the extreme supported ends of the isolators, as shown in FIG. 3, and occurs at a first spring rate while the further deflection of the isolator members 48 occasioned when torque loads greater than those in the low torque range are transferred by the coupling 30 is uniform but is over only the respective lengths of the isolator members between respective locations 84 and 86 thereof supported by the ribbing 64 and 66, as shown in FIG. 4, this further deflection being at a second spring rate which is greater than the first spring rate. Thus, it will be appreciated that the value of the second spring rate is dependent upon the distance that the ribbing ends 80 and 84 are spaced from each other and that other snubber members may be substituted for the snubber members 60 and 62 if a different spring rate is desired in the isolator members 48 for yieldably resisting a high range of torque loads.

The operation of the coupling 30 is thought to be clearly evident from the foregoing description and for the sake of brevity, no further description of the operation is submitted.

We claim:

1. In a vehicle transmission drive including a flywheel, an input shaft adjacent to and coaxial with the flywheel and a torsional isolator coupling connected between the flywheel and the input shaft, the improvement comprising: said coupling including drive and driven members spaced axially in their entirety from each other and respectively fixed to the flywheel and input shaft for respective rotation therewith; a plurality of yieldable resilient isolator members; and first and second means respectively mounting opposite ends of the isolator members for rotation with the drive and driven members and for free deflection between said opposite ends for yieldably resisting, at a first spring rate, relative rotation between the drive and driven members induced by torque loads below a predetermined torque load; and isolator member snubber means mounted on the drive and driven members in operative association with the isolator members for engaging and supporting the latter between said opposite ends to thereby inhibit said free deflection for increasing the spring rate thereof above said first rate to a second spring rate only when torque loads above said predetermined torque load are being transferred between the flywheel and input shaft.

2. The transmission drive defined in claim 1 wherein said snubber means includes surface means which engage each of the isolator members at a pair of intermediate locations spaced from each other and from opposite ends of each of the isolator members only when the torque load is at least as high as said predetermined torque load, the surface means acting to then support the isolator members such that torque loads greater than said predetermined torque loads will deflect the isolator members between the respective pair of intermediate loactions thereof at the second spring rate.

3. The transmission drive defined in claim 2 wherein said isolator members are cylindrical and said snubber means including first and second snubber members respectively fixed to the drive and driven members and respectively including networks of ribbing projecting axially towards each other and disposed in substantial encircling relationship to the opposite end portions of the isolator members; and said surface means being first and second axially facing surfaces respectively of the ribbing networks of the first and second snubber members.

4. The transmission drive defined in claim 2 wherein the first and second axially facing surfaces are rounded.

5. The transmission drive defined in claim 2 wherein the drive and driven members are each in the form of a plate and said isolator members having their opposite ends respectively bolted to the drive and driven members.

6. The transmission drive defined in claim 5 wherein said flywheel includes an axially extending annular flange having an annular end surface; said drive member being fixed to the flange at said end surface; said input shaft having an end rotatably supported in the flywheel and said drive member being fixed to the input shaft at a location encircled by the flywheel flange.

7. An engine drive dampener, comprising: a drive member, adapted for connection to an engine crankshaft, rotatable about a drive axis: an input shaft, adapted for driving a load, disposed along said axis and having an end adjacent the drive member; a torsional isolator coupling connected between the drive member and input shaft and constituting the sole means by which rotation of the drive member is transferred to the input shaft; said coupling including a drive plate fixed for rotation with the drive member; a driven plate spaced axially in its entirety from the drive plate and fixed for rotation with the input shaft; yieldable resilient means extending between and fixed solely to said drive and driven plates for yieldably resisting torque transfer between the drive member and input shaft at a first rate when the torque transferred is within a predetermined range; and support means carried by said drive and driven plates adjacent said yieldable resilient means for engaging the latter, only after it has yielded in response to a transfer of torque at the upper limit of said predetermined range, to increase the rate of resistance the yieldable resilient means has to the transfer of torque in excess of the upper limit of said predetermined range.

8. The engine drive dampener defined in claim 7 wherein said yieldable resilient means comprises a plurality of cylindrical, equiangularly spaced, elastomeric members, each having opposite ends fixed to the drive and driven plates; and said support means including a pair of snubber members respectively fixed to the drive and driven plates and respectively including networks of ribbing extend axially toward each other and at least partially encircling opposite end portions of said elastomeric members.

* * * * *